United States Patent [19]

Miller

[11] Patent Number: 4,490,802
[45] Date of Patent: * Dec. 25, 1984

[54] TAKEOFF WEIGHT COMPUTER APPARATUS FOR AIRCRAFT

[75] Inventor: Harry Miller, Scottsdale, Ariz.

[73] Assignee: Sperry Corporation, New York, N.Y.

[ * ] Notice: The portion of the term of this patent subsequent to Aug. 29, 1995 has been disclaimed.

[21] Appl. No.: 333,098

[22] Filed: Dec. 21, 1981

[51] Int. Cl.³ .................... G01G 19/10; G01N 19/02
[52] U.S. Cl. .................................. 364/567; 364/463; 73/9; 340/945
[58] Field of Search ............... 364/426, 427, 463, 567; 73/9, 65, 178 T; 340/27 SS, 27 AT, 27 R

[56] References Cited

U.S. PATENT DOCUMENTS 4,018,111  7/1978  Hardmärk et al. ................... 73/9
4,110,605  8/1978  Miller ................................ 364/463

Primary Examiner—Errol A. Krass
Assistant Examiner—Kevin J. Teska
Attorney, Agent, or Firm—Howard P. Terry

[57] ABSTRACT

The takeoff weight of an aircraft is computed from measures of the thrust of the engines and the forward acceleration of the aircraft detected over a time period when such acceleration is at a maximum following brake release on the runway. A major variable that must be considered is the coefficient of rolling friction of the landing gear of the particular aircraft involved and other factors inducing ground roll drag. The present invention calculated this variable as a function of engine thrust and manifest weight for each takeoff of the aircraft and updates weighted filter values thereof for use during subsequent takeoffs. For each takeoff, therefore, and average value of rolling friction is used to calculate takeoff weight, which average value becomes more nearly the actual value for the existing condition of the landing gear.

8 Claims, 2 Drawing Figures

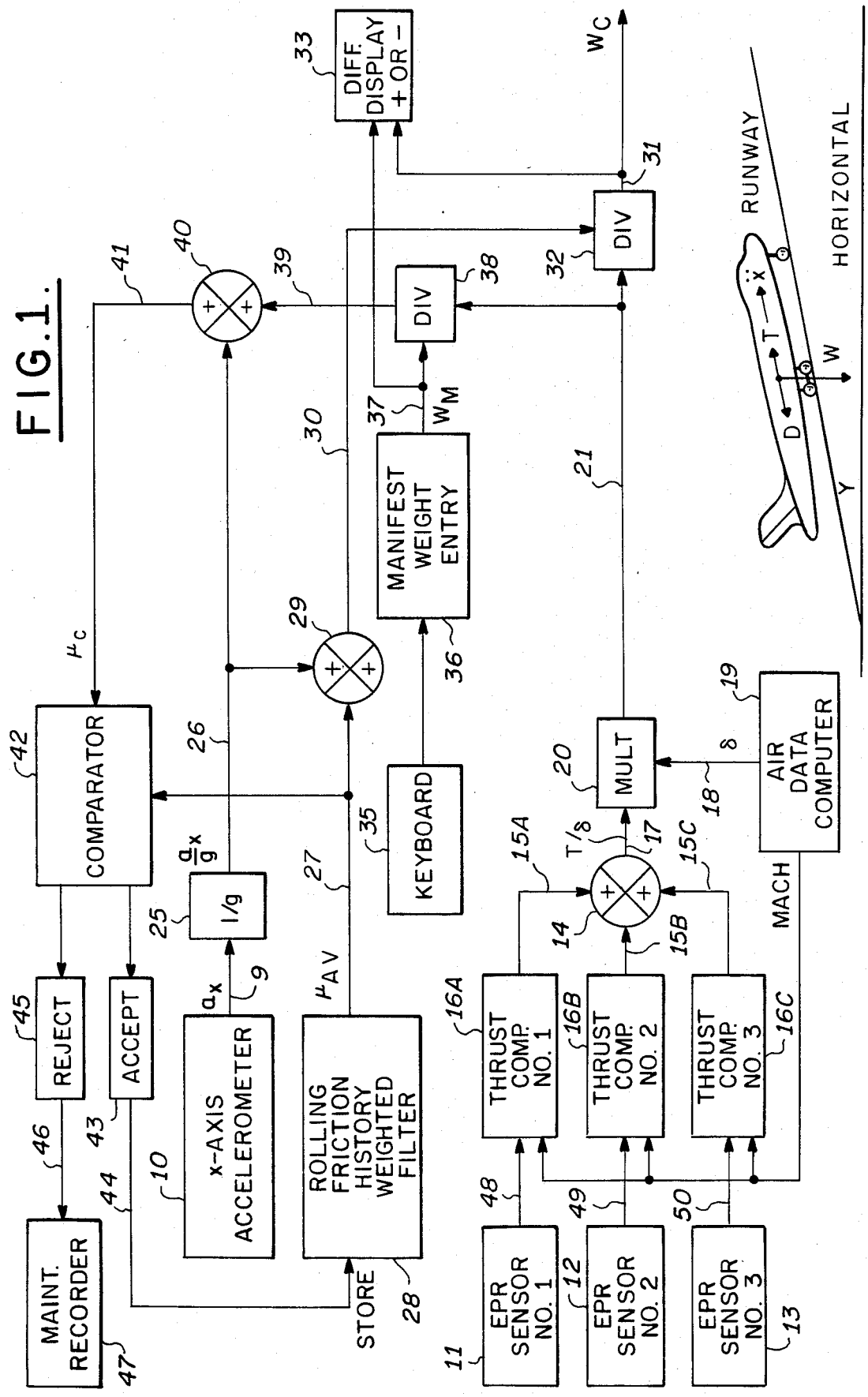

TAKEOFF WEIGHT COMPUTER APPARATUS FOR AIRCRAFT

BACKGROUND OF THE INVENTION

1. Field of the Invention

The present invention relates generally to aircraft performance management systems and more specifically to apparatus for computing the takeoff weight of the aircraft.

2. Description of the Prior Art

The takeoff weight of an aircraft is a critical parameter used by a pilot and/or a performance management system in determining climb, cruise, descent, holding and approach performance of the aircraft. Normally, the aircraft weight is the manifest weight determined by the operating company's procedures. The present invention provides a means for providing the pilot with a more accurate measure of the aircraft's actual takeoff weight by calculations involving the thrust imparted to the aircraft by the engines, the resulting acceleration and the average rolling friction characteristic of the landing gear during the takeoff procedure. Also, by calculating the average rolling friction factor, the pilot may be made aware of unusual takeoff conditions such as dragging brakes and the like for which maintenance action may be required. In performance management, the takeoff weight parameter computed by the present invention may be used to automatically compute climb, cruise, descent and approach parameters based on more accurate data than the manifest weight.

The present invention provides substantially improved performance with respect to the takeoff weight computer disclosed in the present inventor's U.S. Pat. No. 4,110,605 also assigned to the present assignee. In that patent, the rolling friction factor was assumed to be a known and constant value for a particular aircraft model. In practice, this is not the case for an individual aircraft and the present invention takes this into account to thereby provide a substantially more accurate measure of the aircraft's takeoff gross weight.

SUMMARY OF THE INVENTION

The present invention is directed to apparatus for computing the takeoff weight of an aircraft broadly based on Newton's second law of motion; that is, by measuring the thrust imparted to the aircraft by the engines and measuring the resultant aircraft acceleration during the takeoff roll when acceleration along the runway is a maximum. Since maximum acceleration occurs at a speed at which aerodynamic drag is not very significant, this factor may be neglected. Also, if the accelerometer is fixed to the longitudinal axis of the aircraft, the slope or inclination of the runway is automatically accounted for. Thus, the only major variable requiring consideration is the rolling friction of the landing gear. The present invention provides apparatus for computing the rolling friction factor at each takeoff based upon manifest weight, summing its latest value with all reasonable previous values and using a weighted average value for the computation of actual takeoff weight.

BRIEF DESCRIPTION OF THE DRAWINGS

FIG. 1 of the drawings illustrates a preferred embodiment of the present invention and constitutes a block diagram of that apparatus of a complete performance management system active during the takeoff run for computing the takeoff weight of the aircraft; and FIG. 2 illustrates the forces and accelerations acting on the aircraft after application of takeoff power and useful to a full understanding of the invention.

DESCRIPTION OF THE PREFERRED EMBODIMENT

Before describing the takeoff weight computer apparatus of FIG. 1, it will be helpful to consider the mathematical basis thereof, reference being made to FIG. 2. It is recognized that this mathematical analysis is also presented in the above-referenced U.S. Pat. No. 4,110,605 but will be repeated herein for convenience.

FIG. 2 illustrates graphically the forces and accelerations acting on the aircraft just after brake release or just after the application of full takeoff power by the flight crew. From a definition and analysis of these forces and accelerations, the following relationships may be derived:

$T$ = Thrust on aircraft due to engines
$D$ = Drag on aircraft due to aerodynamic resistance and to rolling friction
$W$ = Weight of the aircraft
$\ddot{X}$ = True acceleration of the aircraft along the runway
$\gamma$ = Inclination angle of the runway with respect to earth horizontal The balance of forces and accelerations is:

$$T - W \sin \gamma - D = \frac{W}{g} \ddot{X} \quad (1)$$

$$\ddot{X} = a_x - g \sin \gamma \quad (2)$$

$a_x$ = Apparent acceleration of the aircraft which is the output of a linear accelerometer having a sensitive axis aligned parallel with the $X$ axis of the aircraft.

$$D = C_D q S + \mu W \quad (3)$$

wherein:

$C_D$ = Aircraft coefficient of drag
$q$ = Dynamic pressure = $.7 \, p_s M^2$
$p_s$ = Atmospheric pressure
$M$ = Mach number
$S$ = Aircraft wing area
$\mu$ = Coefficient of rolling friction
$g$ = gravity acceleration Combining equations (1), (2) and (3) and solving for W:

$$W = \frac{T - .7 C_D p_s M^2 S}{\frac{a_x}{g} + \mu} \quad (4)$$

Since the calculation for W is made substantially at the start of the takeoff roll when the acceleration is a maximum and since at this time M is small, the aerodynamic drag terms in equation (4) can be neglected without impacting the accuracy of the weight measure. Thus, $$W = \frac{T}{\frac{a_x}{g} + \mu} \qquad (5)$$

It should be noted that the use of a longitudinal accelerometer which reflects a combination of true acceleration and the inclination of the runway results in relationship (5) being independent of the slope of the runway.

Referring now to FIG. 1, a preferred implementation of the takeoff weight computer will be described. The two primary terms used in the computation which require basic sensors thereof are aircraft apparent acceleration and the thrust imparted to the aircraft by the engines. A signal proportional to the apparent acceleration of the aircraft relative to the runway is provided on lead 9 by a linear accelerometer 10 mounted on the airframe with its sensitive axis aligned parallel to the aircraft longitudinal axis. Such accelerometer may be of any conventional type, for example, such as described in the present assignee's U.S. Pat. No. 3,992,951. A signal proportional to the thrust on the aircraft is ultimately provided using a conventional engine pressure ratio (EPR) sensor normally associated with each engine of the aircraft. In the present embodiment a three-engine aircraft has been assumed and three EPR sensors 11, 12 and 13 are involved. Since the total thrust on the aircraft is the sum of the thrust provided by each engine, these separate signals are added, as by summing device 14, after thrust computers 16A, 16B and 16C determine the thrust of each engine, respectively.

The normalized thrust exerted on the aircraft is referred to as thrust over δ where δ is the static pressure ratio of the atmospheric conditions existing. This term is a predetermined function of EPR and Mach for a particular engine as illustrated in FIG. 3 of the above U.S. Pat. No. 4,110,605 patent which is incorporated herein by reference. In the preferred embodiment, a table of thrust values (T/δ) versus EPR and Mach is stored in a memory, as in a conventional memory within static thrust computers 16A, 16B, 16C, which memory is addressed by the existing engine EPR signals on leads 48, 49, 50 and by Mach number signal from air data computer 19 to provide on lead 17 a signal proportional to the existing normalized thrust T/δ acting on the aircraft. Since it is required to provide a measure of the actual thrust T independent of the atmospheric pressure term δ, a signal proportional to δ on lead 18 is provided from a conventional air data computer 19 and supplied to a multiplier 20 responsive also to the T/δ signal for removing the δ term. Thus, the output signal of the multiplier 20 on lead 21 is the required measure of the thrust T acting on the aircraft.

The acceleration term $a_x$ is conventionally multiplied by the reciprocal of the gravity constant 1/g at 25 to provide on lead 26 the $a_x/g$ term required by equation (5). Also, in accordance with the present invention, the average value $\mu_{AV}$ of the rolling friction of the landing gear is provided on lead 27 from a conventional rolling friction weighted filter 28, weighted as a function of previous values of rolling friction, to be further described below. This signal is summed with the acceleration term at summing device or means 29 to provide on lead 30 a signal proportional to the denominator of equation (5). The final signal on lead 31 is proportional to actual takeoff weight since the thrust output on lead 21 is processed through conventional divider device 32 the dividend of which is the thrust signal T on lead 21 and the divisor of which is the acceleration plus rolling friction signal on lead 30. The actual weight signal on lead 31 may be supplied to any utilization apparatus requiring a measure of aircraft takeoff weight, such as for example, a performance management system. Also, the actual weight signal may be supplied to a suitable display apparatus 33 together with the manifest weight signal, to be described, to indicate to the pilot any difference therebetween.

As stated above, and in accordance with the present invention, the signal proportional to the average value of rolling friction $\mu_{AV}$ on lead 27 is derived from a weighted filter 28 weighted in accordance with the history of past values of rolling friction. The contents of filter 28 existing prior to a present takeoff is a value $\mu_{AV}$ which has been weighted heavily in favor of old values of $\mu$ and weighted lightly in favor of the newest value thereof. Such filters are well known in the art and accomplish this function by weighting gain constants. The apparatus for calculating this rolling friction term will now be described.

Equation (5) expresses the relationship between the dynamic terms, thrust, acceleration and rolling friction for determining aircraft weight. While the thrust and acceleration terms may be physically measured with good accuracy, the rolling friction term cannot be conveniently physically measured because of the variables contributing to it. For example, its value will vary with the condition of the landing gear wheel bearings, tire pressure, brakes, aircraft weight, crosswinds and the existing runway surface conditions such as standing water, snow, slush and the like. However, if the value of rolling friction could be measured during each takeoff of the aircraft, a very accurate measure of rolling friction can be provided by taking the weighted average value thereof over a large number of takeoffs. A computed measure of rolling friction suitable for providing such average value is available.

Equation (5) above may be solved for $\mu$:

$$\mu = \frac{T}{W} - \frac{a_x}{g} \qquad (6)$$

Thus, since measures of T and $a_x/g$ are already available, the value of $\mu$ may be calculated if a physical measure of weight is available. Since aircraft weight is a critical takeoff parameter, an estimate thereof is always available before any takeoff and is referred to as manifest weight; that is, an estimated aircraft weight based on the aircraft's empty weight, fuel quantity, number of passengers, baggage, freight, etc. The manifest weight estimate will have a variance from actual weight which will be high for some flights and low for others. Calculations of $\mu$ based on equation (6) will therefore also have high and low values, the average of which should converge to the actual coefficient of rolling friction.

Referring again to FIG. 1, the apparatus of the present invention includes a manifest weight entry panel or keyboard 35 which may be any of a number of known types of data entry devices such as an alphanumeric pushbutton panel having a visual readout and by means of which the pilot may enter the aircraft's manifest weight. This data is entered into manifest weight entry 36 where it is conventionally converted into an electrical signal proportional thereto, which signal $W_M$ appears on lead 37. In accordance with equation (6) this signal is supplied as a divisor to divider 38, the dividend being the thrust signal on lead 21. The quotient output signal on lead 39 therefore represents the first term of equation (6). The second term is represented by the signal on lead 26 proportional to $a_x/g$ which is subtracted from the signal on lead 39 by combining device 40, the resulting difference signal on lead 41 being proportional to the computed value of rolling friction $\mu_c$ for the present takeoff in accordance with equation (6). This present $\mu_c$ signal is supplied to the filter 28 where, as described above, it is conventionally combined with the weighted average of all previous values of $\mu_c$. Thus, the filter 28 effectively contains the weighted sum of all previous values of $\mu_c$ and hence, represents a history of the rolling friction characteristic of the aircraft.

It may be desirable to evaluate the value of the computed rolling friction term in order to determine whether or not it is grossly abnormal. There may be conditions which would cause this term to be abnormally high and since the value of the rolling friction term used in the weight computation is the average value, such abnormal value could unduly effect such average and the resulting computed takeoff weight. For example, it may be that the takeoff is being made from a slushy runway in which case the resulting increase in drag would result in an abnormally high $\mu_c$. Also, if there is a malfunction causing a dragging brake or one or more of the tires are too soft, etc., the $\mu_c$ value will be abnormally high. Accordingly, the computed value of rolling friction on lead 41 for the present takeoff is compared with the average value on lead 27 by means of comparator 42. If the new value is within predetermined deviation limits, it is considered to be acceptable and is further processed by accept circuit 43 and passed onto the filter 28 via lead 44. If, however $\mu_c$ signal is not within such limits, it is considered not acceptable and is rejected. The reject circuit 45 processes the unacceptable $\mu_c$ signal to form a flag signal which is passed on via lead 46 to a suitable maintenance recording apparatus 47 where it is ultimately conventionally used to set a landing gear maintenance display, indicating that there may be a landing gear abnormality which requires correction.

It will be appreciated by those skilled in the art that the present invention may be implemented using either conventional analog computation instrumentation or conventional digital computation apparatus. In the former cases, the various functional blocks may be implemented from analog circuits such as operational amplifiers, configured to perform the required mathematical summing, multiplication, division and logical functions. Similarly, these same mathematical and logical functions may be implemented in a digital computer, preferably using conventional and well understood analog-to-digital converters, microprocessor computations, analog-to-digital converters and programming techniques. The digital implementation has an advantage in that it enables the computation be made at a point when the acceleration is at a maximum. Using a high speed digital computer, the weight calculation may be made several times a second, say, at 0.25 second intervals, using sampled acceleration and thrust measures and using as the final value, the average of the highest acceleration and corresponding thrust samples.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. Apparatus for providing a measure of actual takeoff weight of an aircraft, comprising:
    means for providing a measure of engine thrust of said aircraft,
    means for providing a measure of longitudinal acceleration of said aircraft,
    means for providing a measure of rolling friction of said aircraft, which measure is an average value of a plurality of rolling friction measures obtained over a plurality of prior aircraft takeoffs, and
    means responsive to said measures of thrust, acceleration and friction for providing an output measure of said takeoff weight of said aircraft as a predetermined function of said thrust, acceleration and friction measures.

2. The apparatus as set forth in claim 1 wherein said predetermined function is of the form $$W = \frac{T}{\frac{a_x}{g} + \mu_{AV}}$$

wherein:

| |
|---|
| W = actual aircraft takeoff weight |
| T = engine thrust imparted to said aircraft |
| $a_x$ = longitudinal acceleration of said aircraft |
| g = gravity acceleration |
| $\mu_{AV}$ = average value of said aircraft rolling friction. |

3. The apparatus as set forth in claim 1 wherein said rolling friction measure providing means comprises:
    means for providing a measure of the estimate takeoff weight of the aircraft for a present takeoff, and
    means responsive to said estimated aircraft weight measure for providing a measure of the present rolling friction as a function of said thrust, acceleration and estimated weight measures.

4. The apparatus as set forth in claim 3 wherein said predetermined function is of the form of $$\mu = \frac{T}{W_M} - \frac{a_x}{g}$$

wherein:

| |
|---|
| $\mu$ = a measure of the value of the rolling friction of said aircraft at a specific takeoff |
| $W_M$ = the estimated weight of the aircraft at a specific takeoff |
| T = the thrust imparted to the aircraft by the engines |
| $a_x$ = longitudinal acceleration of the aircraft |
| g = gravity acceleration. |

5. The apparatus as set forth in claim 3 wherein said estimated aircraft takeoff weight is the manifest weight.

6. The apparatus as set forth in claim 5 wherein said value of rolling friction measure providing means further includes weighted filter means responsive to said present and a plurality of past rolling friction measures for providing a weighted average of said rolling friction measures wherein the values of said plurality of past measures are weighted more heavily than the values of said present measure.

7. The apparatus as set forth in claim 6 wherein said rolling friction measure providing means further includes comparator means responsive to said present rolling friction measure said weighted filter measure for rejecting predetermined values of said present measure from said weighted filter means.

8. The apparatus as set forth in claim 7 further comprising maintenance recorder means responsive to said rejected rolling friction measure.

* * * * *